Figure 1:
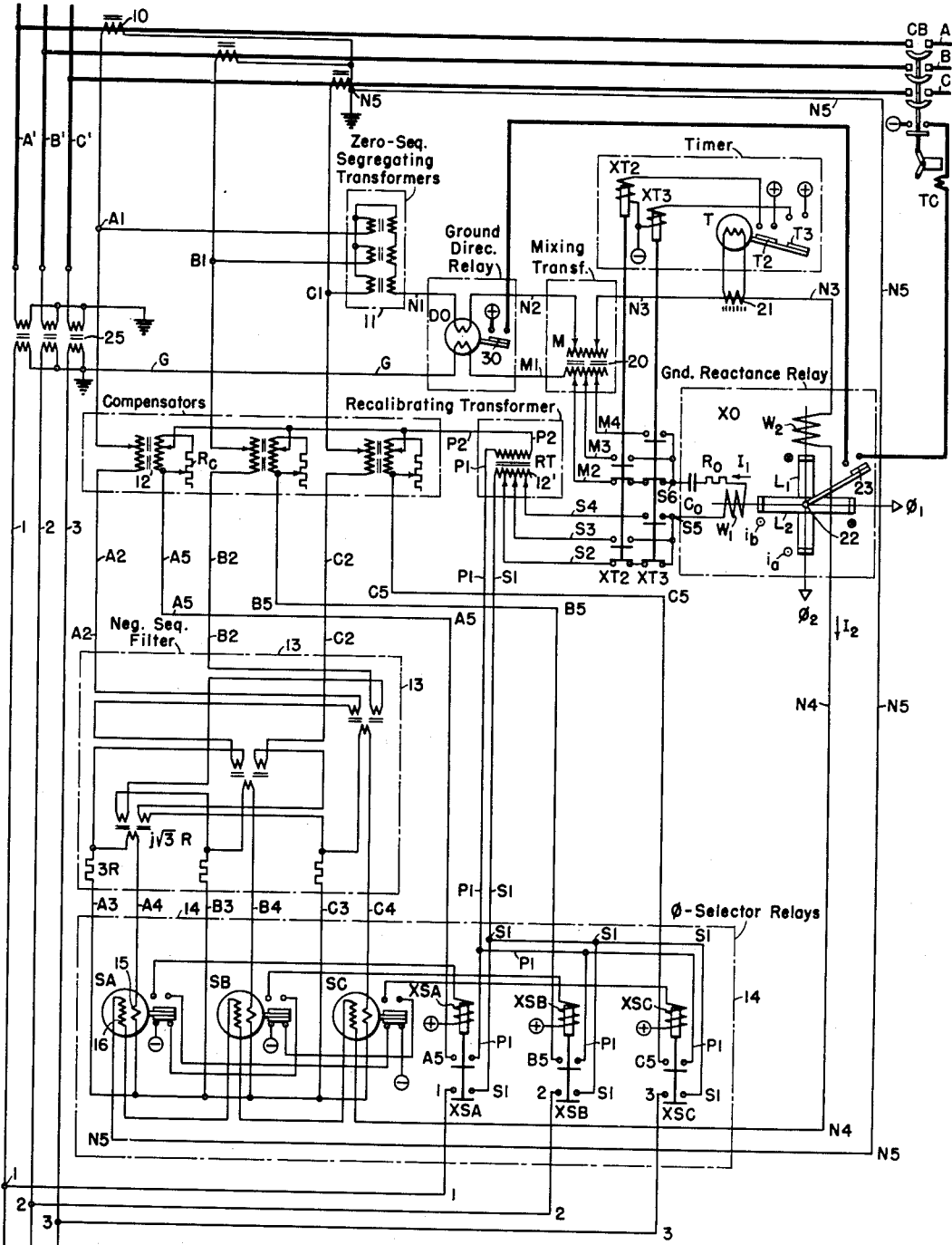

April 24, 1956 S. L. GOLDSBOROUGH 2,743,396
GROUND DISTANCE RELAY
Filed Aug. 16, 1952 2 Sheets-Sheet 1

WITNESSES:
Robert C Baird
Leon M. Garman

INVENTOR
Shirley L. Goldsborough.
BY O.B. Buchanan
ATTORNEY

April 24, 1956  S. L. GOLDSBOROUGH  2,743,396
GROUND DISTANCE RELAY
Filed Aug. 16, 1952  2 Sheets-Sheet 2

WITNESSES:
Robert C. Baird
Leon M. Garman

INVENTOR
Shirley L. Goldsborough.
BY O. B. Buchanan
ATTORNEY

United States Patent Office 2,743,396
Patented Apr. 24, 1956

2,743,396

GROUND DISTANCE RELAY

Shirley L. Goldsborough, Basking Ridge, N. J., assignor to Westinghouse Electric Corporation, East Pittsburgh, Pa., a corporation of Pennsylvania Application August 16, 1952, Serial No. 304,817

15 Claims. (Cl. 317—18)

My invention relates to protective relaying-apparatus for responding to ground-faults on a three-phase line, and it has particular relation to the equipment for measuring or responding to the distance between the relaying point and a single line-to-ground fault on the protected line.

Ground distance relays are single-phase reactance-measuring relays, which may be differential or balanced-beam elements, as shown for example in the Mehring Patent 2,439,944, or they may be double-loop or other product-type relays such as are shown, for example, in my Patent 2,380,164. Such relays require special currents and voltages, depending upon the faulted phase, and the current or voltage must be compensated to remove the voltage-drop caused by the flow of the positive and negative-sequence currents in the line, between the relaying point and the fault, as set forth in a Lewis Patent 1,897,022. The most successful ground distance relays use the zero-sequence line-current, and the line-to-ground line-voltage in the faulted phase, with voltage-compensation in response to the faulted-phase line-current from which the zero-sequence component has been removed, as shown in Fig. 9 of the Lewis patent.

In addition to the foregoing, ground reactance relays are usually or invariably designed for plural-zone operation, usually involving three zones or reaches of the distance-measuring element, the first zone being for faults lying within the protected line-section and having a response-time which is as nearly instantaneous as is feasible; while the second and third zones are for more remote faults, with time-delayed operation which is provided by a timer.

An object of my invention is to provide a special recalibrating-transformer for coupling the faulted-phase line-current compensator to the faulted-phase line-to-ground voltage, using the timer for changing both the compensator-setting and the reach of a single reactance-responsive ground-fault relaying-element, which thus serves for faults in all three zones. As has been known before, selector-relays may be used to select the faulted phase. In this way, I greatly simplify the construction of the ground-fault relaying-equipment, producing a small unit which has a much lower cost, which should result in increased use of distance ground relaying.

A further object of my invention is to provide specific current and voltage energizations for a product-type ground-fault reactance-relay of the type shown in my Patent 2,380,164, as distinguished from the currently used balanced-beam type of ground-fault reactance-relay such as is shown in the Mehring Patent 2,439,944. The product-type element is believed to be superior to the beam-type element in obtaining more accurate reactance-measuring characteristics. The reactance-type ground-fault element may be controlled with the same timer-operated switching-means, and with the same faulted-phase selector-operated switching-means, which is applicable to the balanced-beam or differential type of reactance-element.

Figure 2:
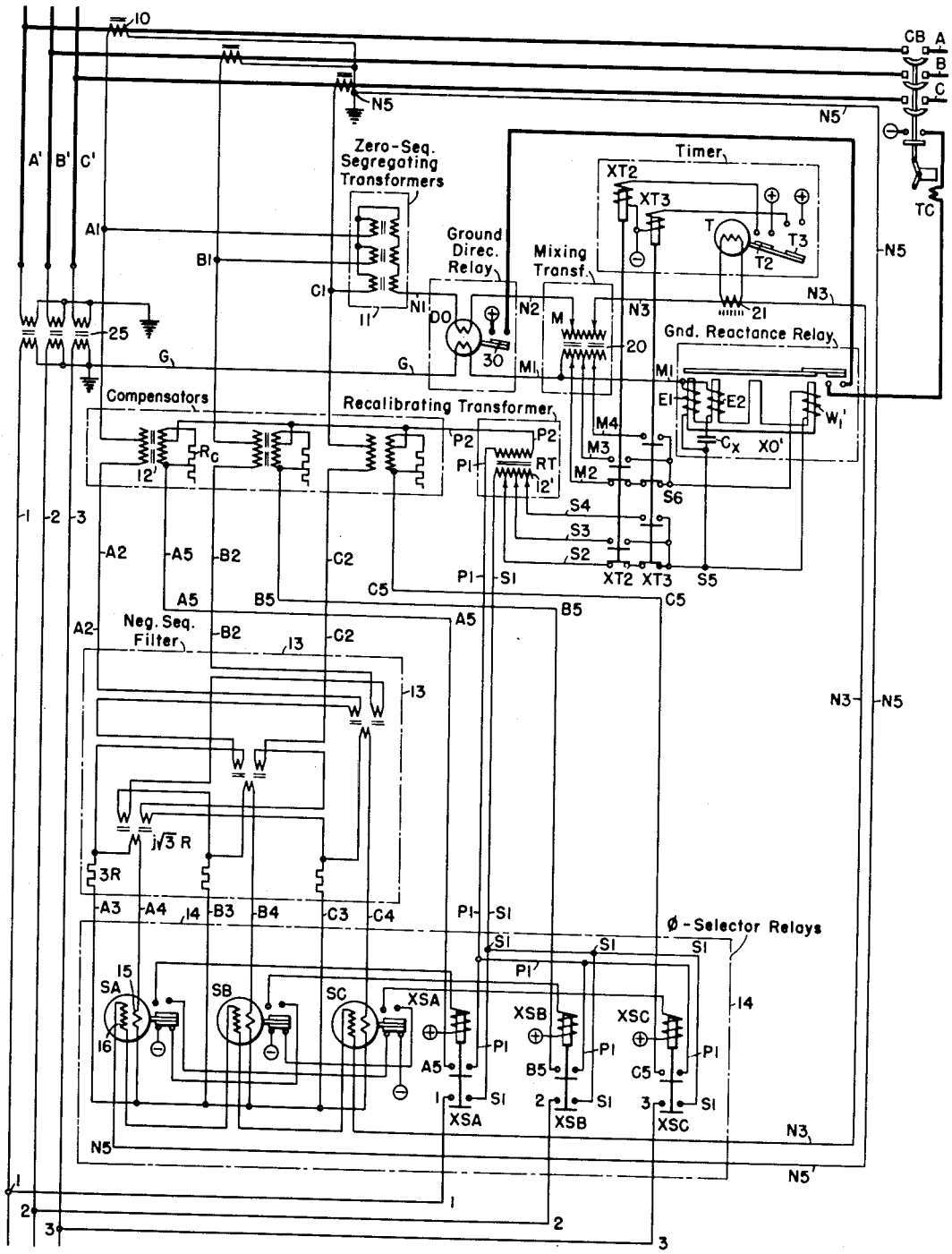

With the foregoing and other objects in view, my invention consists in the circuits, systems, combinations, apparatus, parts, and methods of design and operation, as hereinafter described, and as shown in the accompanying drawing, wherein:

Figure 1 is a simplified diagrammatic view of circuits and apparatus, showing illustrative connections for only the ground-fault distance-measuring element of protective relaying-apparatus for a three-phase line, omitting the phase-fault relays and various conductors, indicators and alarms, which are commonly used, and illustrating the ground-fault distance-measuring reactance-relaying as a double-loop product-type relay, and Fig. 2 is a similar view, in which the ground-fault distance-measuring relay is of the balanced-beam differential type.

In Fig. 1, I show my invention as being applied to the ground-fault protection of a three-phase line A, B, C, which is connected to a three-phase station-bus A', B', C' through a three-phase circuit breaker CB. A set of star-connected line-current transformers 10 is used to derive the three line-curents, in terminals A1, B1 and C1. The zero-sequence component is first removed from these derived line-currents, by connecting the conductors A1, B1 and C1 to a set of zero-sequence segregating transformers 11, which provide a path for the zero-sequence current-component in a conductor N1 which will be subsequently described. Each phase of the derived line-currents is first passed through the primary winding of its own air-gap compensator-transformer 12, and thence to the conductor A2, B2 or C2, as the case may be.

In connection with the three compensators 12, it will be noted that the primary turns are adjustable, and that the secondary winding of each compensator is connected to an adjustable compensator-resistance $R_c$. Each of the secondary windings of the compensators is also provided with an adjustable tapped-point which is connected to a common terminal or conductor P2 which is connected to one terminal of the primary winding of a recalibrating transformer RT, which has a multi-tapped secondary winding 12' which will be subsequently described.

The three derived line-currents, as contained in the conductors A2, B2 and C2, are next passed through a negative-sequence filter 13, which delivers three voltages corresponding to the negative-sequence current-components, in terminals A3—A4, B3—B4 and C3—C4, respectively. The negative-sequence filter 13 is of a type in which the line-current in each phase is passed through a resistance 3R, and the voltage-drop through this resistance is augmented by an air-gap reactor-transformer $j\sqrt{3}R$, which subtracts an impedance-drop $j\sqrt{3}R$ times the line-current in the next lagging phase, and adds the impedance-drop $j\sqrt{3}R$ times the line-current in the third phase.

The negative-sequence currents of the conductors A3—A4, B3—B4, and C3—C4 are fed into a phase-selector relay-panel 14, which may be regarded as being representative of any means for selecting the line-phase which is subjected to a single-phase line-to-ground fault. The particular phase-selector 14, which is illustrated, uses three directional phase-selector relays SA, SB and SC, which compare the relative directions of the negative-sequence line-currents with the zero-sequence line-currents, as set forth in my previous Patents Nos. 2,320,861 and 2,408,208. These directionally responsive phase-selector relays SA, SB and SC have current-coils 15, which are energized with the proper phase of the negative-sequence currents from the conductors A3—A4, or B3—B4, or C3—C4, as the case may be. Said relays have voltage-coils 16, which are energized with the zero-sequence line-current, by being connected to a conductor N5 which is connected to the star-point of the line-current transformers 10, as will be subsequently described.

The phase-selector relays SA, SB and SC are used to energize auxiliary phase-selector relays XSA, XSB and XSC whenever a response of any particular selector-relay SA, SB or SC occurs at a time when there is no response of the selector-relay for the next leading phase. In this way, the auxiliary phase-selector relays XSA, XSB and XSC are caused to be responsive only to single ground faults.

Referring, now, to the zero-sequence segregating-transformers 11, which provide a circuit N1 for the zero-sequence current-component which is extracted from the conductors A1, B1 and C1, it will be noted that the conductor N1 supplies the zero-sequence current first to the current-coil of a ground directional relay DO, and thence, through a conductor N2, to the primary winding of a mixing transformer M. This mixing transformer M is a two-winding air-gap transformer having a multi-tapped secondary winding 20, which will be subsequently referred to.

Continuing the description of the path of the zero-sequence current from the conductor N2 to the primary winding of the mixing transformer M, it will be noted that this zero-sequence current-path continues to a conductor N3, to which is connected a saturating current-transformer 21 which supplies a timer-motor T which has a normal off-position, and which has two timer-contacts T2 and T3 which close after successively greater times of operation of the timer, as is well understood. These timer-contacts T2 and T3 are used to energize two auxiliary timer-relays XT2 and XT3, respectively, so as to provide a large number of timer-responsive contacts which will subsequently be described.

Continuing the description of the progress of the zero-sequence current from the conductor N3 in Fig. 1, it will be noted that this current next passes through the current-responsive winding or windings $W_2$ of a product-type ground-reactance relay XO, after which the zero-sequence current continues through a conductor N4, and thence through the three voltage-coils 16 of the selector-relays SA, SB and SC, after which the current returns to the star-point N5 of the line-current transformers 10.

The ground-reactance relay XO, in Fig. 1, is illustrated, in a preferred form of embodiment, as being of a double-loop 4-pole type of directional or product-responsive relay, which is non-vibratory in the sense that it eliminates all double-frequency torque-pulsations, as set forth in a previous Patent No. 2,380,197, issued to Sonnemann, Mehring and myself. The product-type relaying-element XO of Fig. 1 has a 4-pole primary member which produces two single-phase diametrically flowing fluxes $\varphi_1$ and $\varphi_2$, which are centered about stationary pole-axes which are at right angles to each other, or, in general, at any angle to each other. These stationary single-phase fluxes $\varphi_1$ and $\varphi_2$ are produced, respectively, by two stationary winding-means $W_1$ and $W_2$ which are carried by the stator-poles of the relay.

This ground-reactance relay XO also has an induced-current rotatably mounted secondary member in which currents are induced by the primary fluxes $\varphi_1$ and $\varphi_2$. In the preferred form of construction which is illustrated in Fig. 1, this induced-current rotatably mounted secondary member is in the form of two loops $L_1$ and $L_2$, which are normally disposed in inductive relationship to the two primary fluxes $\varphi_1$ and $\varphi_2$, respectively. These loops are rigidly carried by a shaft 22, which also carries a contact-member 23 which closes a contact in response to a relay-operation.

My illustrated relaying-system also includes a bank of star-star connected potential-transformers 25, which are shown as being energized from the station-bus A', B', C', for the purpose of deriving the three line-to-ground line-voltages, which are produced in the conductors 1, 2 and 3, respectively.

The auxiliary selector relays XSA, XSB and XSC have make-contacts which connect a selected one of the potential-terminals 1, 2 or 3, as the case may be, to one of the secondary terminals S1, of the secondary winding 12' of the recalibrating transformer RT, thus selecting which line-to-ground voltage is to be applied to the winding W1 of the reactance relay XO, as will be subsequently described. At the same time when any one of the auxiliary selector relays XSA, XSB or XSC selects one of the line-voltages of one of the conductors 1, 2 and 3, another contact of that same auxiliary selector-relay XSA, XSB or XSC connects the primary-winding terminal P1 of the recalibrating transformer RT to a selected one of the conductors A5, B5, C5, as the case may be, which are connected to the secondary windings of the respective compensator-transformer 12, so as to select the proper compensator-voltage which is to be added to the voltage of the potential-conductors 1, 2 or 3, as the case may be. In this way, whichever line-voltage is selected by the phase-selector relaying-assembly 14 is compensated by the addition of a compensator-voltage which is responsive to the line-current in the same line-phase.

After the faulted-phase line-voltage has been selected, and compensated by the proper compensator 12, through the coupling which is provided by the recalibrating transformer RT, the voltage-circuit is continued, through a selected one of the tapped secondary terminals S2, S3 and S4 of the recalibrating transformer RT, and applied to a conductor S5. The tapped secondary circuits S2, S3 and S4 are selected by suitable contacts on the auxiliary timer-relays XT2 and XT3, in such manner that the secondary circuit S2 is selected, in the normal non-actuated position of the timer T, the secondary circuit S3 is selected when the timer-contact T2 is closed, and the secondary circuit S4 is selected when the timer-contact T3 is closed.

The conductor S5 applies the selected compensated voltage to one terminal of the reactance-relay winding $W_1$, and the other terminal of this winding $W_1$ is connected to a conductor S6, through a resistor $R_0$ and a capacitor $C_0$ which put the current drawn by the $W_1$ winding in phase with the applied potential.

The conductor S6 is conected, by means of suitable contacts on the auxiliary timer-relays XT2 and XT3, to selected secondary terminals M2, M3 and M4 of the secondary winding 20 of the mixing transformer M, the selection being made in the same manner as has been described for the secondary terminals S2, S3 and S4 of the recalibrating transformer RT. The secondary winding 20 of the mixing transformer M has a terminal M1 which is connected, through the potential winding of the ground directional relay DO, to the grounded star-point G of the secondary windings of the potential transformers 25.

The ground directional relay DO has a make-contact 30 which is included in a tripping-circuit which extends through the reactance-relay contact 23 to the trip coil TC of the circuit breaker CB in a known manner.

The operation of the apparatus shown in Fig. 1 will now be described.

Following the method of analysis set forth in the Mehring Patent 2,380,187, let us excite the two windings $W_1$ and $W_2$ of the double-loop product-type relay XO with relay-current $I_1$ and $I_2$, having instantaneous values $$i_1 = K_1E \sin wt + K_2I \sin (wt - \theta - x) \quad (1)$$

and $$i_2 = -K_4I \sin (wt - \theta - y) \quad (2)$$

where $\theta$ is the angle by which the line-current I lags the line-voltage E, and $x$ and $y$ are additional lag-angles by which the current-components of the relay lag the line-current I.

The instantaneous fluxes produced by the relay-currents $i_1$ and $i_2$ are $$\varphi_1 = C_1K_1E \sin (wt - a) + C_1K_2I \sin (wt - \theta - x - a) \quad (3)$$

and $$\varphi_2 = -C_2K_4I \sin (wt - \theta - y - b) \quad (4)$$

respectively, where $C_1$ and $C_2$ are constants, and $a$ and $b$ are the angles by which the fluxes lag the respective exciting-currents.

The instantaneous loop-currents induced by the respective fluxes $\phi_1$ and $\phi_2$ in the loops $L_1$ and $L_2$, respectively, are $$i_a = KC_1K_1E \sin(wt-a-c-90) + KC_1K_2I \sin(wt-\theta-x-a-c-90) \quad (5)$$

and $$i_b = -KC_2K_4I \sin(wt-\theta-y-b-c-90) \quad (6)$$

where $K$ is a constant, and $c$ is the power-factor angle of both loops $L_1$ and $L_2$.

The instantaneous torque of the relay XQ is $$t = i_a\phi_2 - i_b\phi_1 \quad (7)$$

where the first torque-component is of the general type $$i_a\phi_2 = [k_1E \sin wt + k_2I \sin(wt-\theta-x)] . k_4I \sin(wt-\theta-\theta_4-90) \quad (8)$$

and the second torque-component is of a similar type, $$i_b\phi_1 = [k_1E \sin wt + k_2I \sin(wt-\theta-x)] . k_4I \sin(wt-\theta-\theta_5-90) \quad (9)$$

Remembering that $$\sin A \sin B = \tfrac{1}{2}[\cos(A-B) - \cos(A+B)] \quad (10)$$

we may write the instantaneous torque of Equation 7 as $$t = -\tfrac{1}{2}KC_1C_2K_1K_4EI[\cos(\theta-a+b-c+y-90) - \cos(2wt-\theta-a-b-c-y-90)]$$
$$-\tfrac{1}{2}KC_1C_2K_2K_4I^2[\cos(-a+b-c-x+y+90) - \cos(2wt-2\theta-a-b-c-x-y-90)]$$
$$+\tfrac{1}{2}KC_1C_2K_1K_4EI[-\cos(\theta-a+b+c+y-90) - \cos(2wt-\theta-a-b-c-x-y-90)]$$
$$+\tfrac{1}{2}KC_1C_2K_2K_4I^2[\cos(a-b-c+x-y-90) - \cos(2wt-2\theta-a-b-c-x-y-90)]$$

$$(11)$$

$$\therefore t = -\tfrac{1}{2}KC_1C_2K_1K_4EI[\cos(\theta-a+b+y-90-c) + \cos(\theta-a+b+y-90+c)]$$
$$+\tfrac{1}{2}KC_1C_2K_2K_4I^2[\cos(-c-a+b-x+y+90) + \cos(-c+a-b+x-y-90)]$$

$$(12)$$

Remembering that $$\cos(A+B) + \cos(A-B) = 2\cos A \cos B \quad (13)$$

we may write the instantaneous torque of Equation 12 as $$t = -KC_1C_2K_1K_4EI \cos c \cos(\theta-a+b+y-90)$$
$$+KC_1C_2K_2K_4I^2 \cos c \cos(a-b+x-y-90) \quad (14)$$

At the balance point, $t=0$, and hence $$\frac{E \cos(\theta-a+b+y-90)}{I} = \frac{K_2 \cos(a-b+x-y-90)}{K_1} \quad (15)$$

If $(-a+b+y) = 0$ or $180°$ (16)

Equation 15 for the balance point becomes $$\frac{E \cos(\theta-90)}{I} = \frac{E \sin \theta}{I} = X = \frac{K_2}{K_1} \cos(x-90) \quad (17)$$

The flux-angles $a$ and $b$ may readily be made equal to each other, by symmetrical design. No additional lag-angle $y$ need be used for the second relay-current $I_2$, thus making $y=0$; or the terminals of the current-winding $W_2$ may be reversed, making $y=180°$. A $90°$ lag-angle $x$ can easily be obtained (as by means of the air-gap current-transformer M), for the line-current-responsive component in the composite relay-current $i_1$. If these conditions are satisfied, the relay XO will have a a balance-point at $$\frac{E \sin \theta}{I} = X = \frac{K_2}{K_1} \quad (18)$$

which is a reactance-measuring response.

With these design-constants, the double-loop product-type relay XO may be considered representative of any product-type relay having a steady torque which is a product-response of the general type, $$T = [k_1E - k_2 \angle (\theta+90)] \cdot [k_4I \angle (\theta+90)]$$
$$= k_1k_4EI \sin -k_2k_4I^2 \quad (19)$$

having a balance-point, $T=0$, at $$\frac{E \sin \theta}{I} = X = \frac{k_2}{k_1} \quad (20)$$

where $\theta$ is the angle by which the line-current $I$ lags the line-voltage $E$.

It will thus be seen, from the foregoing analysis of the operation of the Fig. 1 apparatus, that my phase-selectors 14 determine which line-phase is being subjected to a single-phase ground-fault, and thereupon select the proper line-to-ground voltage and the proper line-current-responsive compensator-voltage to be applied to the terminal S5 of the relay-winding $W_1$. The mixing transformer M, being an air-gap transformer, introduces a serially connected voltage, which is responsive to the zero-sequence line-current, but dephased $90°$ with respect to said current, and connects this current-responsive voltage in series with the other terminal S6 of the relay-winding $W_1$. In this manner, the ground reactance relay XO is properly excited, according to which one of the line-phases is grounded.

At the same time, the timer T, being energized in response to the zero-sequence line-current, is in reality a sensitive ground-fault detector, which is responsive to remote faults, regardless of direction.

It will be noted, from Equation 18, that the reach or distance-setting of the reactance relay XO is determined by the magnitude of either the coefficient $K_2$ which determines how much of the zero-sequence line-current $I$ is added to the selected line-voltage, or the coefficient $K_1$ which determines what proportion of the selected line-voltage is applied to the relay. In the system which is illustrated in Fig. 1, the $K_2$ coefficient is controlled by the secondary taps M2, M3 and M4 of the mixing transformer M.

In the initial or non-actuated position of the timer T, the auxiliary timer-relays XT2 and XT3 select the first-zone distance-setting M2 of the mixing transformer M, and in the second and third actuated positions of the timer T, the longer distance-settings M3 and M4 are respectively selected. As the distance-setting from the relaying point to the fault-location is increased, by the recalibrating effect of the mixing transformer secondary-terminals M2, M3 and M4, it is necessary also to increase the amount of compensation which is required to remove the voltage-drop caused by the flow of the positive and negative-sequence line-currents from the relaying point to the fault-location, and this compensation-recalibration is in like manner accomplished by the auxiliary timer-relays XT2 and XT3, which select the proper secondary terminal S2, S3 or S4 of the recalibrating transformer RT. In this manner, the single single-phase ground-reactance relay XO of Fig. 1 is properly responsive, whatever phase is faulted, and if the fault is not instantaneously cleared, the relay is recalibrated to properly serve as a second-zone relay, or, if necessary, a third-zone relay, thus accomplishing the ground relaying operations with a minimum amount of equipment.

While I have shown my apparatus, in Fig. 1, as applied to a product-type ground-reactance relay XO, which is believed to be superior, in obtaining accurate reactance-measuring characteristics, the general principles of using the timer-contacts to change both the compensator-setting and the reach of the reactance-responsive relaying-element are applicable also to any other type of reactance-responsive element, such as the differential or beam-type element which has heretofore been used for distance-measuring ground-relay purposes.

Fig. 2 differs from Fig. 1 in showing the substitution of a balanced-beam type of ground reactance relay XO′ for the product-type relay XO of Fig. 1. In Fig. 2, the relay has an operating coil W1, which is energized in response to the selected compensated line-to-ground voltage, plus an additional voltage which is responsive to the zero-sequence line-current, displaced 90°, as supplied by the mixing transformer M. In Fig. 2, the differential or beam-type relay XO′ has two restraint-windings E1 and E2, one of which is dephased with respect to the other, by means of a dephasing capacitor Cx, to smooth out pulsations in the restraining force on the relay, as is well understood. These two restraining windings E1 and E2 are energized so as to be responsive to the selected compensated voltage, as it appears across the conductors S5 and M1 respectively, thus making the restraint-windings E1 and E2 responsive to the compensated voltage alone, without any addition of a response to the zero-sequence line-current.

For the differential-type reactance-relay XO′ of Fig. 2, we may write $$(K_1E - jK_2I)^2 - (K_1E)^2 = 0 \quad (21)$$
$$[K_1E - K_2I \angle (\theta + 90)]^2 = K_1^2E^2 \quad (22)$$
$$K_1^2E^2 - 2K_1K_2EI \cos(\theta + 90) + K_2^2I^2 = K_1^2E^2 \quad (23)$$
$$\frac{E \sin \theta}{I} = X = \frac{K_2}{2K_1} \quad (24)$$

Here, again, it will be seen that the reach or distance-setting of the differential reactance-relay XO′ of Fig. 2 may be adjusted by an adjustment of either one of the coefficients K2 or K1, which respectively determine how much of the current and how much of the voltage are being used. If the voltage-ratio K1 were changed, it will be understood that the same voltage-ratio should be applied to both the operating winding W1′ and the restraint-windings E1 and E2 of the relay, as shown in Equation 21. However, since the mixing transformer M is readily available, as an easy way of introducing a current-responsive voltage-component in series with the selected compensated line-voltage, the provision of the secondary taps M2, M3 and M4 on this mixing transformer constitutes a very convenient way of adjusting the current-ratio coefficient K2 in Equation 24, and this is the distance-adjustment which is used in Fig. 2 as well as in Fig. 1.

While I have shown my invention in only two illustrated forms of embodiment, I wish it to be understood that my invention is not limited, in its broadest aspects, to all of the precise details which are shown, and that various changes may be made, by way of addition and omission, and the substitution of various equivalents, within the broadest scope of my invention.

I claim as my invention:

1. A plural-zone relaying-apparatus for responding to ground-faults on a three-phase line, comprising a distance-measuring ground-fault reactance-responsive relaying-element, means for deriving a suitable alternating-current electrical quantity from the line-voltages and applying the same to said reactance-responsive relaying-element, means for deriving a suitable alternating-current electrical quantity from the line-currents and applying the same to said reactance-responsive relaying-element, means for deriving a separate alternating-current compensator-voltage from a suitable electrical quantity of the line and applying the same to said reactance-responsive relaying-element, a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the reach of the reactance-responsive relaying-element.

2. A plural-zone relaying-apparatus for responding to ground-faults on a three-phase line, comprising a distance-measuring ground-fault reactance-responsive relaying-element; a first relay-quantity-deriving means, for deriving a suitable alternating-current electrical quantity from each of the line-to-ground line-voltages; a second relay-quantity-deriving means, for deriving one or more suitable alternating-current electrical quantities from the line-currents; a third relay-quantity-deriving means, for deriving one or more separate alternating-current compensator-voltages from the line; a phase-selector means, for selecting the faulted phase and for applying the proper relaying quantities to said reactance-responsive relaying element from said three relay-quantity-deriving means; a timing-means having an initial condition and a time-delayed condition; a means responsive to remote ground-faults on the line for so energizing said timing-means that it will begin to change from its initial condition to its time-delayed condition; and a means responsive to the time-delayed condition of said timing-means for changing both the compensator-setting and the reach of the reactance-responsive relaying-element.

3. A plural-zone relaying-apparatus for responding to ground-faults on a three-phase line, comprising a distance-measuring ground-fault reactance-responsive relaying-element having two sets of relay-terminals, a means for deriving a line-to-ground voltage from one phase of said line, a means for deriving the line-current from the same phase of the line, a compensator-means for compensating said derived line-to-ground voltage in response to said derived line-current, a means for deriving the zero-sequence current of the line, a means for combining the compensated line-to-ground voltage and the derived zero-sequence current with a 90-degree phase-shift between them and for thus energizing a first set of said relay-terminals, a means for energizing the other set of said relay-terminals with one of the two quantities which were combined to energize the first set of relay-terminals, a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the reach of the reactance-responsive relaying-element.

4. A plural-zone relaying-apparatus for responding to ground-faults on a three-phase line, comprising a distance-measuring ground-fault reactance-responsive relaying-element having two sets of relay-terminals, a means for deriving each of the line-to-ground voltages of the line, a means for deriving a line-current from each of the phases of the line, a compensator-means for compensating each of said derived line-to-ground voltages in response to the derived line-current from the same line-phase, a phase-selector means for selecting the faulted phase and for selecting the compensated line-to-ground voltage for that phase, a means for deriving the zero-sequence current of the line, a means for combining the selected compensated line-to-ground voltage and the derived zero-sequence current with a 90-degree phase-shift between them and for thus energizing a first set of said relay-terminals, a means for energizing the other set of relay-terminals with one of the two quantities which said relay-terminals with one of the two quantities which were combined to energize the first set of relay-terminals, a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the reach of the reactance-responsive relaying-element.

5. A relaying-apparatus for responding to ground-faults on a three-phase line, comprising a product-type relaying-element of a type which operates in response to the product of two single-phase relay-quantities multiplied by a function of the phase-angle between them, said relaying-element having two sets of relay-terminals for the respective relay-quantities, a means for deriving a line-to-ground voltage from one phase of said line, a means for deriving the line-current from the same phase of the line, a compensator-means for compensating said derived line-to-ground voltage in response to said derived line-current, a means for deriving the zero-sequence current of the line, a means for combining the compensated line-to-ground voltage and the derived zero-sequence current with a 90-degree phase-shift between them and for thus energizing a first set of said relay-terminals, and a means for energizing the other set of said relay-terminals in response to said derived zero-sequence current.

6. The invention as defined in claim 5, in combination with a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the reach of the reactance-responsive relaying-element.

7. A relaying-apparatus for responding to ground-faults on a three-phase line, comprising a product-type relaying-element of a type which operates in response to the product of two single-phase relay-quantities multiplied by a function of the phase-angle between them, said relaying-element having two sets of relay-terminals for the respective relay-quantities, a means for deriving each of the line-to-ground voltages of the line, a means for deriving a line-current from each of the phases of the line, a compensator-means for compensating each of said derived line-to-ground voltages in response to the derived line-current from the same line-phase, a phase-selector means for selecting the faulted phase and for selecting the compensated line-to-ground voltage for that phase, a means for deriving the zero-sequence current of the line, a means for combining the selected compensated line-to-ground voltage and the derived zero-sequence current with a 90-degree phase-shift between them and for thus energizing a first set of said relay-terminals, and a means for energizing the other set of said relay-terminals in response to said derived zero-sequence current.

8. The invention as defined in claim 7, in combination with a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the reach of the reactance-responsive relaying-element.

9. A plural-zone relaying-apparatus for responding to ground-faults on a three-phase line, comprising a distance-measuring ground-fault reactance-responsive relaying-element having two sets of relay-terminals, a means for deriving a line-to-ground voltage from one phase of said line, a means for deriving the line-current from the same phase of the line, a compensator-means for compensating said derived line-to-ground voltage in response to said derived line-current, a means for deriving the zero-sequence current of the line, a two-winding air-gap transformer, a means for causing the primary winding of said transformer to be traversed by said derived zero-sequence current, a means for serially connecting the secondary winding of said transformer to a first set of said relay-terminals and to the source of said compensated line-to-ground voltage, a means for suitably energizing the other set of said relay-terminals, a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the effective turn-ratio of said air-gap transformer.

10. A plural-zone relaying-apparatus for responding to ground-faults on a three-phase line, comprising a distance-measuring ground-fault reactance-responsive relaying-element having two sets of relay-terminals, a means for deriving each of the line-to-ground voltages of the line, a means for deriving a line-current from each of the phases of the line, a compensator-means for compensating each of said derived line-to-ground voltages in response to the desired line-current from the same line-phase, a phase-selector means for selecting the faulted phase and for selecting the compensated line-to-ground voltage for that phase, a means for deriving the zero-sequence current of the line, a two-winding air-gap transformer, a means for causing the primary winding of said transformer to be traversed by said derived zero-sequence current, a means for serially connecting the secondary winding of said transformer to a first set of said relay-terminals and to the source of said selected compensated line-to-ground voltage, a means for suitably energizing the other set of said relay-terminals, a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the effective turn-ratio of said air-gap transformer.

11. A relaying-apparatus for responding to ground-faults on a three-phase line, comprising a product-type contact-controlling relaying-element having an induced-current rotatably mounted secondary member and a stationary primary member which includes two winding-means for establishing two stationary single-phase fluxes which are spaced at an angle to each other, a means for deriving a line-to-ground voltage from one phase of said line, a means for deriving the line-current from the same phase of the line, a compensator-means for compensating said derived line-to-ground voltage in response to said derived line-current, a means for deriving the zero-sequence current of the line, a two-winding air-gap transformer, a means for causing the primary winding of said transformer to be traversed by said derived zero-sequence current, a means for serially connecting the secondary winding of said transformer to a first winding-means of said relaying-element and to the source of said compensated line-to-ground voltage, and a means for causing the other winding-means of said relaying-element to be traversed by said derived zero-sequence current.

12. The invention as defined in claim 11, in combination with a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the compensator-setting and the effective turn-ratio of said air-gap transformer.

13. A relaying-apparatus for responding to ground-faults on a three-phase line, comprising a product-type contact-controlling relaying-element having an induced-current rotatably mounted secondary member and a stationary primary member which includes two winding-means for establishing two stationary single-phase fluxes which are spaced at an angle to each other, a means for deriving each of the line-to-ground voltages of the line, a means for deriving a line-current from each of the phases of the line, a compensator-means for compensating each of said derived line-to-ground voltages in response to the derived line-current from the same line-phase, a phase-selector means for selecting the faulted phase and for selecting the compensated line-to-ground voltage for that phase, a means for deriving the zero-sequence current of the line, a two-winding air-gap transformer, a means for causing the primary winding of said transformer to be traversed by said derived zero-sequence current, a means for serially connecting the secondary winding of said transformer to a first winding-means of said relaying-element and to the source of said compensated line-to-ground voltage, and a means for causing the other winding-means of said relaying-element to be traversed by said derived zero-sequence current.

14. A relaying-apparatus for responding to ground-faults on a three-phase line, comprising a differential relaying-element of a type which operates in response to the difference between the magnitudes of two single-phase relaying-quantities, said relaying-element having two sets of relay-terminals for the respective relaying-quantities, a means for deriving a line-to-ground voltage from one phase of said line, a means for deriving the line-current from the same phase of the line, a compensator-means for compensating said derived line-to-ground voltage in response to said derived line-current, a means for deriving the zero-sequence current of the line, a two-winding air-gap transformer, a means for causing the primary winding of said transformer to be traversed by said derived zero-sequence current, a means for serially connecting the secondary winding of said transformer to a first set of said relay-terminals and to the source of said compensated line-to-ground voltage, a means for connecting the other set of relay-terminals to the aforesaid source of compensated line-to-ground voltage so as to have a voltage-response which is substantially equal to the voltage-responsive part of the response of said first set of relay-terminals, a timing-means having an initial condition and a time-delayed condition, a means responsive to remote ground-faults on the line for so energizing said time-means that it will begin to change from its initial condition to its time-delayed condition, and a means responsive to the time-delayed condition of said timing-means for changing both the compensator-setting and the effective turn-ratio of said air-gap transformer.

15. A relaying-apparatus for responding to ground-faults on a three-phase line, comprising a differential relaying-element of a type which operates in response to the difference between the magnitudes of two single-phase relaying-quantities, said relaying-element having two sets of relay-terminals for the respective relaying-quantities, a means for deriving each of the line-to-ground voltages of the line, a means for deriving a line-current from each of the phases of the line, a compensator-means for compensating each of said derived line-to-ground voltages in response to the derived line-current from the same line-phase, a phase-selector means for selecting the faulted phase and for selecting the compensated line-to-ground voltage for that phase, a means for deriving the zero-sequence current of the line, a two-winding air-gap transformer, a means for causing the primary winding of said transformer to be traversed by said derived zero-sequence current, a means for serially connecting the secondary winding of said transformer to a first set of said relay-terminals and to the source of said selected compensated line-to-ground voltage, a means for connecting the other set of relay-terminals to the aforesaid source of compensated line-to-ground voltage so as to have a voltage-response which is substantially equal to the voltage-responsive part of the response of said first set of relay-terminals, a timing-means having an initial condition and a time-delayed condition, a means responsive to remote ground-faults on the line for so energizing said timing-means that it will begin to change from its initial condition to its time-delayed condition, and a means responsive to the time-delayed condition of said timing-means for changing both the condition of the compensator-setting and the effective turn-ratio of said air-gap transformer.

References Cited in the file of this patent

UNITED STATES PATENTS

| 1,745,386 | Stoecklin et al. | Feb. 4, 1930 |
| 2,320,861 | Goldsborough | June 1, 1943 |
| 2,380,164 | Goldsborough | July 10, 1945 |
| 2,405,079 | Warrington | July 30, 1946 |
| 2,408,208 | Goldsborough | Sept. 24, 1946 |
| 2,426,062 | Sonnemann | Aug. 19, 1947 |
| 2,584,765 | Warrington | Feb. 5, 1952 |